United States Patent
Ishikawa et al.

(10) Patent No.: US 11,554,811 B2
(45) Date of Patent: Jan. 17, 2023

(54) VEHICLE LOWER BODY STRUCTURE

(71) Applicant: Mazda Motor Corporation, Hiroshima (JP)

(72) Inventors: Yasushi Ishikawa, Hiroshima (JP); Yuichi Morita, Hiroshima (JP); Yamaguchi Yusaku, Hiroshima (JP); Imajo Hideyuki, Hiroshima (JP); Miyoshi Katsuhisa, Hiroshima (JP); Nishimoto Masaya, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 0 days.

(21) Appl. No.: 17/383,438

(22) Filed: Jul. 23, 2021

(65) Prior Publication Data

US 2022/0041221 A1 Feb. 10, 2022

(30) Foreign Application Priority Data

Aug. 6, 2020 (JP) .............................. JP2020-133809

(51) Int. Cl.
*B62D 25/02* (2006.01)
*B62D 25/04* (2006.01)
*B62D 21/15* (2006.01)
*B62D 27/02* (2006.01)

(52) U.S. Cl.
CPC ........... *B62D 25/025* (2013.01); *B62D 21/15* (2013.01); *B62D 21/152* (2013.01); *B62D 25/04* (2013.01); *B62D 27/023* (2013.01)

(58) Field of Classification Search
CPC ..... B62D 25/025; B62D 21/15; B62D 27/023
USPC ...................... 296/209, 29, 30, 187.09, 187.1
See application file for complete search history.

(56) References Cited

U.S. PATENT DOCUMENTS

| | | | |
|---|---|---|---|
| 9,889,888 B2 * | 2/2018 | Narahara | ............... B62D 25/14 |
| 10,189,505 B2 * | 1/2019 | Narahara | ............. B62D 25/025 |

FOREIGN PATENT DOCUMENTS

JP       2015-58749 A     3/2015

* cited by examiner

*Primary Examiner* — Dennis H Pedder
(74) *Attorney, Agent, or Firm* — Xsensus LLP

(57) ABSTRACT

A vehicle lower body structure can include: a side sill that forms a first closed cross section extending in a body front-rear direction; and a reinforcing member provided in the first closed cross section to reinforce a front end portion of the side sill. The reinforcing member can have: a front-end reinforcing section that supports a collision load applied to the front end portion of the side sill and directed rearward in a vehicle body; a deformation permission section that permits deformation of the side sill directed inward in a vehicle width direction and rearward at the time when the collision load directed inward in the vehicle width direction and rearward is applied to the front end portion of the side sill; and a deformation suppression section suppressing deformation of the side sill after the deformation of the side sill directed inward in the vehicle width direction and rearward.

19 Claims, 6 Drawing Sheets

VEHICLE LOWER BODY STRUCTURE

CROSS-REFERENCE TO RELATED APPLICATION

The present application claims priority to Japanese App. No. 2020-133809 filed Aug. 6, 2020, the entire content and disclosure of which is incorporated by reference herein in its entirety.

TECHNICAL FIELD

Embodiments of the present disclosure relate to a vehicle lower body structure that can include: a side sill that has a closed cross section extending in a body front-rear direction; and a reinforcing member that reinforces a front end portion of the side sill.

BACKGROUND ART

Prior Art Documents

Patent Documents

[Patent document 1] JP-A-2015-058749

SUMMARY

According to one or more aspects, a vehicle lower body structure is disclosed or implemented. The vehicle lower body structure can comprise: a side sill that extends in a body front-rear direction and forms a first closed cross section; and a reinforcing member that is provided in the first closed cross section to reinforce a front end portion of the side sill. The reinforcing member can have: a front-end reinforcing section that supports a collision load applied to the front end portion of the side sill and directed rearward in a vehicle body; a deformation permission section that permits deformation of the side sill directed inward in a vehicle width direction and rearward at the time when the collision load directed inward in the vehicle width direction and rearward is applied to the front end portion of the side sill; and a deformation suppression section that suppresses deformation of the side sill after the deformation of the side sill directed inward in the vehicle width direction and rearward.

DETAILED DESCRIPTION

Figure 1:
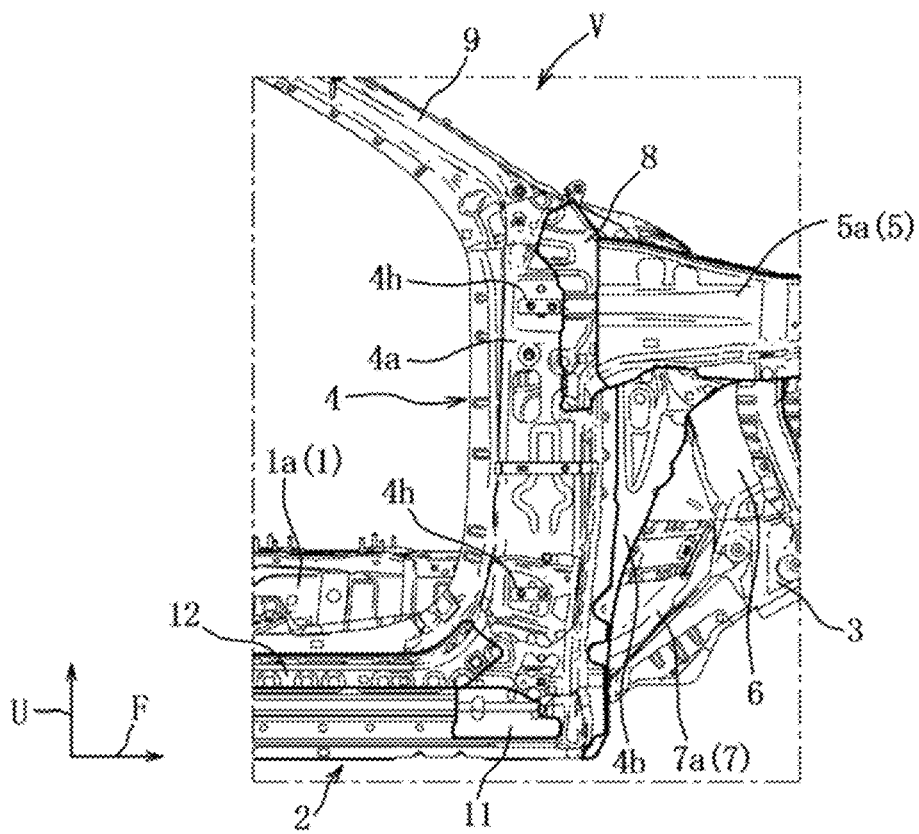
FIG. 1 is a right side view of a vehicle lower body structure according to a first embodiment according to the present disclosure.
Figure 2:
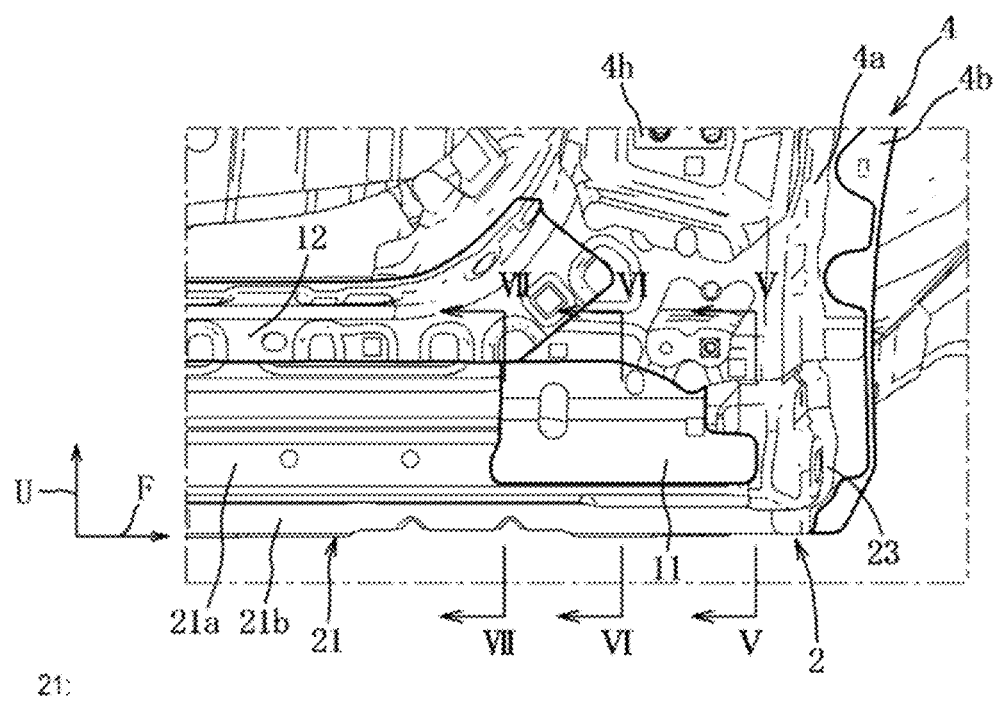
FIG. 2 is an enlarged view of a main section in FIG. 1.

A detailed description will hereinafter be made on embodiments of the present invention with reference to the drawings.

The following description will exemplify application of aspects the present disclosure to a vehicle lower body structure though has no intention to limit embodiments of the present disclosure, application subjects thereof, and application thereof.

It has conventionally been known that, during a so-called small overlap collision in which an obstacle collides with a portion (25% or less of an overlapping area) on an outer side in a vehicle width direction from a front side frame, a front wheel may hit a front end portion of a side sill, which can cause a hinge pillar to collapse to a rear side of a vehicle body. A representative example of the small overlap collision is a small overlap rigid barrier (SORB) test. It has also been known that, when the hinge pillar collapses to the rear side of the vehicle body, a collision load can concentrate on the side sill, which may cause bending deformation of the side sill associated with generated moment.

In view of the above, various technical proposals have been made in relation to handling of the small overlap collision.

For example, a vehicle side structure disclosed in the above-mentioned Patent document 1 has: a hinge pillar having an outer member and an inner member that cooperates with this outer member to form a first closed cross section extending in an up-down direction; and a side sill coupled to a lower end portion of this hinge pillar and having an outer panel and an inner panel that cooperates with this outer panel to form a second closed cross section extending rearward in a vehicle body, and is provided with: a gusset joined to the outer member of the hinge pillar and the outer panel of the side sill; and plural bulk members that partition the second closed cross section of the side sill in a front-rear direction into segmented portions.

By the way, in order to improve design quality and motion performance of the vehicle, there is a case where wheels are upsized. Usually, a tire width is increased with an increase in a wheel diameter, which can increase a ground contact area of a tire with a road surface. As a result, grip performance and cornering performance of the tire can be improved.

When the wheels are upsized, just as described, in response to upsizing of the wheels, the tires with large tire diameters can be accommodated in wheel houses. Thus, a longitudinal dimension of each of the wheel houses can be increased.

In the vehicle side structure disclosed in the above-mentioned Patent document 1, the gusset and the plural bulk members may be newly provided to avoid the collapse of the hinge pillar to the rear side of the vehicle body and the bending deformation of the side sill.

However, with the vehicle side structure disclosed in the above-mentioned Patent document 1, body weight may be increased due to addition of new components including the gusset and the bulk members. In addition, sufficient impact energy absorption performance may not be exerted during the small overlap collision.

In the technique disclosed in the above-mentioned Patent document 1, when the front end portion of the side sill receives the collision load that is directed inward in the vehicle width direction and rearward, the gusset and the plural bulk members respectively may receive a rearward component in the front-rear direction and an inward component in the vehicle width direction of the collision load. Thus, the bending deformation of the side sill may be suppressed.

That is, since the bending deformation of the side sill, which may be caused by the collision load, may be structurally suppressed, the inward component in the vehicle width direction of the collision load directly may act on the side sill, which can induce inward collapse deformation of the side sill. In the inward collapse deformation, the side sill can collapse inward in the vehicle width direction. When the inward collapse deformation of the side sill occurs, shear stress may be applied to a joint portion (a flange) between the outer panel and the inner panel of the side sill by welding. Consequently, the joint portion between the outer panel and the inner panel can be possibly ruptured, and the cross section of the side sill can be possibly misshaped.

In the case where the cross section of the side sill is misshaped, it may be impossible to sufficiently transmit and disperse the collision load rearward in the vehicle body via the side sill. As a result, the cabin may be deformed. In particular, in a case of the vehicle with the upsized wheels, a longitudinal length of each of the wheel houses is increased, which may make it difficult to secure a crush area for impact absorption in the front end portion of the side sill. Thus, compared to the vehicle, the wheels of which may not be upsized, the prominent inward collapse deformation of the side sill can occur during the small overlap collision.

That is, there is room for improvement in the impact energy absorption performance during the small overlap collision.

One or more embodiments of the present disclosure can have a purpose, as one of multiple purposes, of providing a vehicle lower body structure and the like capable of securing a sufficient impact energy absorption performance during a small overlap collision.

According to one or more embodiments, a vehicle lower body structure according to a first aspect can be a vehicle lower body structure that can include: a side sill that extends in a body front-rear direction to form a first closed cross section; and a reinforcing member that is provided in the first closed cross section so as to reinforce a front end portion of this side sill. The reinforcing member can have: a front-end reinforcing section that supports a collision load applied to the front end portion of the side sill and directed rearward in a vehicle body; a deformation permission section that permits deformation of the side sill directed inward in a vehicle width direction and rearward at the time when the collision load, which can be directed inward in the vehicle width direction and rearward, is applied to the front end portion of the side sill; and a deformation suppression section that suppresses deformation of the side sill after the deformation of the side sill directed inward in the vehicle width direction and rearward.

According to vehicle lower body structures according to embodiments of the disclosed subject matter, such as the vehicle lower body structure described in the preceding paragraph, since the reinforcing member has the front-end reinforcing section to support the collision load, which can be applied to the front end portion of the side sill and can be directed rearward in the vehicle body, it can be possible to support a rearward component in the front-rear direction of the collision load, which can be directed inward in the vehicle width direction and rearward. Therefore, it can be possible to suppress a collapse of a hinge pillar to a rear side of the vehicle body. Since the reinforcing member can have the deformation permission section that permits the deformation of the side sill directed inward in the vehicle width direction and rearward at the time when the collision load, which can be directed inward in the vehicle width direction and rearward, applied to the front end portion of the side sill, it can be possible to at least partially absorb the inward component in the vehicle width direction of the collision load, which can be directed inward in the vehicle width direction and rearward, by partial deformation of the side sill.

Since the reinforcing member can have the deformation suppression section to suppress the deformation of the side sill after the deformation of the side sill directed inward in the vehicle width direction and rearward, it can be possible to support the rest of the inward component in the vehicle width direction of the collision load, which can be directed inward in the vehicle width direction and rearward. Therefore, it can be possible to avoid misshaping of a cross section, which can be caused by inward collapse deformation of the side sill, and to transmit and disperse the collision load rearward in the vehicle body.

According to a second aspect of one or more embodiments of the disclosure, according to the first aspect, the deformation permission section can be formed by a notched section that can be formed by notching an outer portion in the vehicle width direction of the reinforcing member. With this configuration, the deformation permission section can have a simple structure, and manufacturing cost of the reinforcing member can be inexpensive.

According to a third aspect of one or more embodiments of the present disclosure, according to the second aspect, the deformation suppression section can include: a first portion that is substantially orthogonal to a body front-rear direction; and a second portion that is substantially orthogonal to the vehicle width direction. With this configuration, the deformation suppression section can have a simple structure.

According to a fourth aspect of one or more embodiments of the disclosure, according to the third aspect, a dimension in the vehicle width direction of a first notched section, which can be formed on a front side of the first portion of the deformation suppression section, can be greater than a dimension in the vehicle width direction of a second notched section, which can be formed at the rear of the first portion of the deformation suppression section.

With this configuration, the side sill can smoothly be deformed inward in the vehicle width direction and rearward.

According to a fifth aspect of one or more embodiments of the disclosure, according to the second aspect, a dimension in the vehicle width direction of the notched section can be increased forward in the body front-rear direction. With this configuration, the reinforcing member can have a simple structure, and the side sill can smoothly be deformed inward in the vehicle width direction and rearward.

According to any one of the first to fifth aspects, a sixth aspect of one or more embodiments of the present disclosure can include: a hinge pillar having an outer member and an inner member that cooperates with this outer member to form a second closed cross section extending in the up-down direction. The inner member can be interposed between an outer panel and an inner panel of the side sill in a manner to divide the first closed cross section into an inner portion and an outer portion in the vehicle width direction. The reinforcing member can be disposed on an outer side in the vehicle width direction from the inner member in the first closed cross section.

With this configuration, the reinforcing member can be downsized.

According to a seventh aspect of one or more embodiments of the disclosure, according to any one of the first to sixth aspects, the reinforcing member can have a step section having a ridgeline, which extends in the body front-rear direction, at the rear of the first portion of the deformation suppression section and on the outer side in the vehicle width direction. With this configuration, it can be possible to transmit and disperse the collision load, which can be applied to the front-end reinforcing section, rearward in the vehicle body by using the ridgeline.

According to the seventh aspect, an eighth aspect of one or more embodiments of the present disclosure can be provided with a fixed section that extends in an up-down direction from an outer side in the vehicle width direction of the step section. The fixed section can be joined to a vertical wall portion of the outer panel. With this configuration, it can be possible to further suppress the inward collapse deformation of the side sill.

According to the eighth aspect, a ninth aspect of one or more embodiments of the disclosure can include: a hinge pillar having an outer member and an inner member that cooperates with this outer member to form a closed cross section extending in the up-down direction; and an outer reinforcing member that reinforces the outer member and is joined to the outer panel of the side sill. Three layers of the fixed section, the outer panel, and the outer reinforcing member can be joined by interposing the outer panel between the fixed section and the outer reinforcing member. With this configuration, it can be possible to transmit and disperse the collision load, which can be applied to the front-end reinforcing section, to the outer member by using the outer reinforcing member.

According to the vehicle lower body structure of one or more embodiments of the present disclosure, the inward component in the vehicle width direction of the collision load can be reduced by using the partial deformation of the side sill, so as to prevent misshaping of the cross section of the side sill. Therefore, it can be possible to secure impact energy absorption performance during a small overlap collision.

First Embodiment

A description will hereinafter be made on a first embodiment of the present disclosure with reference to FIG. 1 to FIG. 11.

As illustrated in FIG. 1, a vehicle V can include: a floor panel 1 that is formed with a tunnel section 1a and constitutes a cabin floor surface; a right and left pair of side sills 2 extending in a front-rear direction; a dashboard that separates an engine compartment provided in a body front portion from a cabin; a right and left pair of front side frames 3 extending forward from the dashboard; a right and left pair of hinge pillars 4 extending upward in an up-down direction from front end portions of the paired side sills 2; a right and left pair of apron reinforcements (hereinafter abbreviated as apron reins) 5 extending forward from upper end portions of the paired hinge pillars 4; and the like.

The vehicle V can be provided with an impact energy absorption mechanism to receive an inward component in a vehicle width direction of a collision load, which can be directed inward in the vehicle width direction and rearward, in two stages during a so-called small overlap collision. In the small overlap collision, an obstacle collides with a portion (e.g., 25% or less of an overlapping area) on an outer side in the vehicle width direction from the front side frame 3, and a representative example of the small overlap collision can be a small overlap rigid barrier (SORB) test.

This impact energy absorption mechanism can have: a first load absorption function to partially absorb the inward component in the vehicle width direction of the collision load, which can be directed inward in the vehicle width direction and rearward, by partial deformation of the side sill 2; and a second load absorption function to support the rest of the inward component in the vehicle width direction of the collision load after the partial deformation of the side sill 2. Since the vehicle V can have a bilaterally-symmetrical structure, the following description will mainly be made on a right portion thereof. In addition, in the drawings, an arrow F direction is set as forward in a body front-rear direction, an arrow OUT direction is set as outward in the vehicle width direction, and an arrow U direction is set as upward in a body up-down direction.

First, a description will be made on a schematic configuration of the vehicle V.

The dashboard can be disposed to extend between the paired hinge pillars 4 in the vehicle width direction. The dashboard can include: a lower dashboard that can be erected upward from a front end portion of the floor panel 1; and an upper dashboard that can be joined to an upper end portion of this lower dashboard.

The paired front side frames 3 can be arranged between the paired side sills 2. As illustrated in FIG. 1, a suspension tower 6 to support a damper in a front-wheel suspension can be formed between the front side frame 3 and the apron rein 5. The suspension tower 6 can include a wheel house 7 to accommodate a front wheel and the front-wheel suspension in an integrated manner. The wheel house 7 can be formed in a portion that is located in front of the dashboard and can correspond to a lower region of the apron rein 5.

The wheel house 7 can include: an outer wheel house that can be arranged on an outer side of an inner member 4b of the hinge pillar 4, which will be described below, and can have a partial arm shape; and an inner wheel house 7a that can be arranged on an inner side of the inner member 4b and can have a partial arm shape. The inner wheel house 7a can be joined to the front side frame 3 and the inner member 4b. The outer wheel house can be joined to the inner member 4b and a lower portion of the apron rein 5.

Next, a description will be made on the pair of hinge pillars 4.

As illustrated in FIG. 1 to FIG. 7, the hinge pillar 4 can have: an outer member 4a that can have a substantially hat-shaped cross section; and the inner member 4b, which can be plate-shaped, that can cooperate with this outer member 4a and can form a second closed cross section C2 that can extend upward and can have a substantially rectangular shape. Each of the outer member 4a and the inner member 4b can be formed from high tensile steel or ultra-high tensile steel.

The outer member 4a can include: a body section that may have a substantially U-shaped cross section; and a front and rear pair of flanges that may extend forward and rearward from a front end portion and a rear end portion of the body section. An upper portion and a lower portion of the body section can be formed with an up and down pair of hinge attachment sections 4h bulging outward in the vehicle width direction. Door hinges of a front door can be attached to the hinge attachment sections 4h.

Next, a description will be made on the pair of apron reins 5.

As illustrated in FIG. 1, the apron rein 5 can have: an outer apron rein member (hereinafter abbreviated as an outer rein member) 5a that can extend from a front end portion of the hinge pillar 4 to a front end portion of the vehicle V; and an inner apron rein member (hereinafter abbreviated as an inner rein member) that can extend from an intermediate portion in the front-rear direction of the outer rein member 5a to the front end portion of the vehicle V.

The outer rein member 5a can be formed from the high tensile steel and can be coupled to the outer member 4a via a cowl side rein 8 (cowl side reinforcement).

The cowl side rein 8 can be joined to the outer member 4a by spot welding, for instance, in a manner to partially overlap with a right end portion of the upper hinge attachment sections 4h, and can be joined to an upper side portion of a front pillar 9 in a manner to cover an upper side of the front pillar 9. The inner rein member, which can have a substantially L-shaped cross section, can be provided to correspond to a front-half portion of the outer rein member 5a, and can cooperate with the outer rein member 5a to form a closed cross section in a substantially rectangular shape that extends in the front-rear direction.

Next, a description will be made on the pair of side sills 2.

Figure 5:
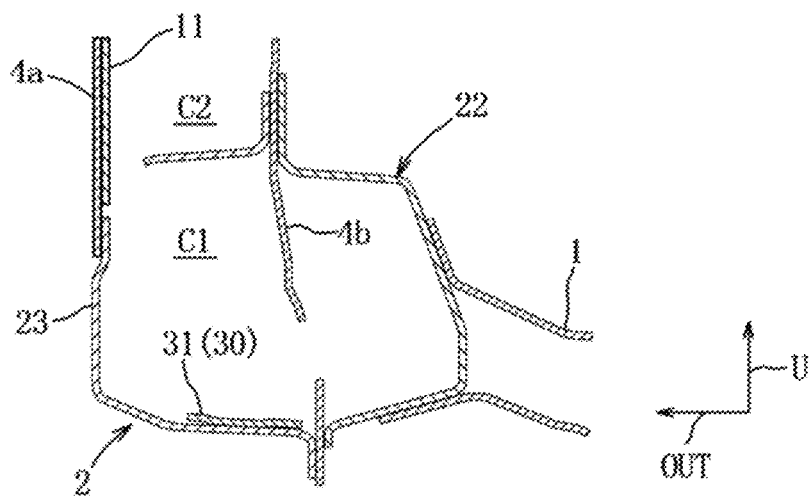
FIG. 5 is a cross-sectional view that is taken along line V-V in FIG. 2.
Figure 6:
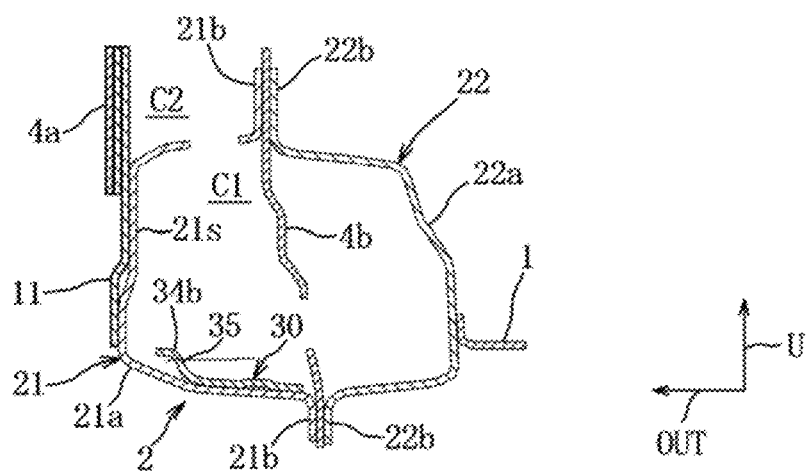
FIG. 6 is a cross-sectional view that is taken along line VI-VI in FIG. 2.
Figure 7:
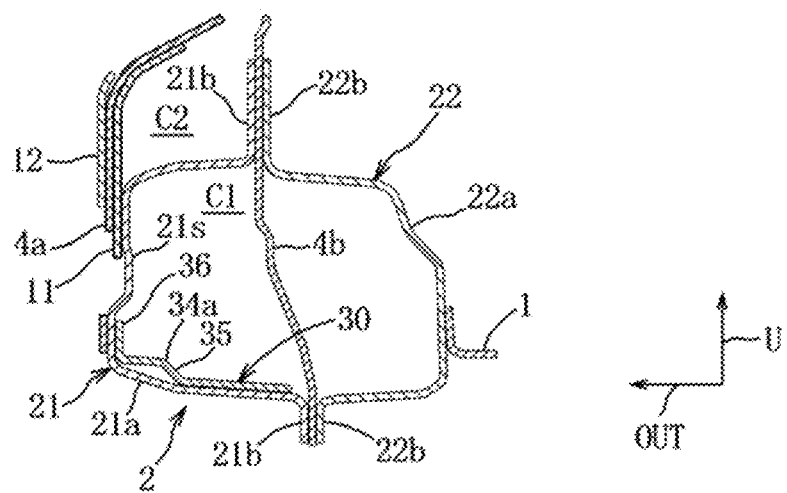
FIG. 7 is a cross-sectional view that is taken along line VII-VII in FIG. 2.

As illustrated in FIG. 1 to FIG. 4, the side sills 2 can be provided to extend in the front-rear direction along both end portions of the floor panel 1 in the vehicle width direction. As illustrated in FIG. 5 to FIG. 7, the side sill 2 can include: an outer panel 21 that can be opened inward in the vehicle width direction and can have a substantially hat-shaped cross section; an inner panel 22 that can be opened outward in the vehicle width direction and can have a substantially hat-shaped cross section; a cap section 23 that can close the front end portion of the side sill 2; and the like.

The outer panel 21 can include: a body section 21a that can have a substantially U-shaped cross section; and an up and down pair of flanges 21b that can extend upward and downward from an upper end portion and a lower end portion of the body section 21a, respectively.

The inner panel 22 can include: a body section 22a that can have a substantially U-shaped cross section; and an up and down pair of flanges 22b that can extend upward and downward from an upper end portion and a lower end portion of the body section 22a, respectively.

The outer panel 21 and the inner panel 22 can form a first closed cross section C1 that can join the paired flanges 21b and the paired flanges 22b, can extend in the front-rear direction, and can have a substantially rectangular shape. Three layers of one of the paired flanges 21b, one of the paired flanges 22b, and the inner member 4b can be joined by interposing the inner member 4b between the flange 21b and the flange 22b. Thus, a front end portion of the first closed cross section C1 can be divided into two in the vehicle width direction by the inner member 4b.

Figure 3:
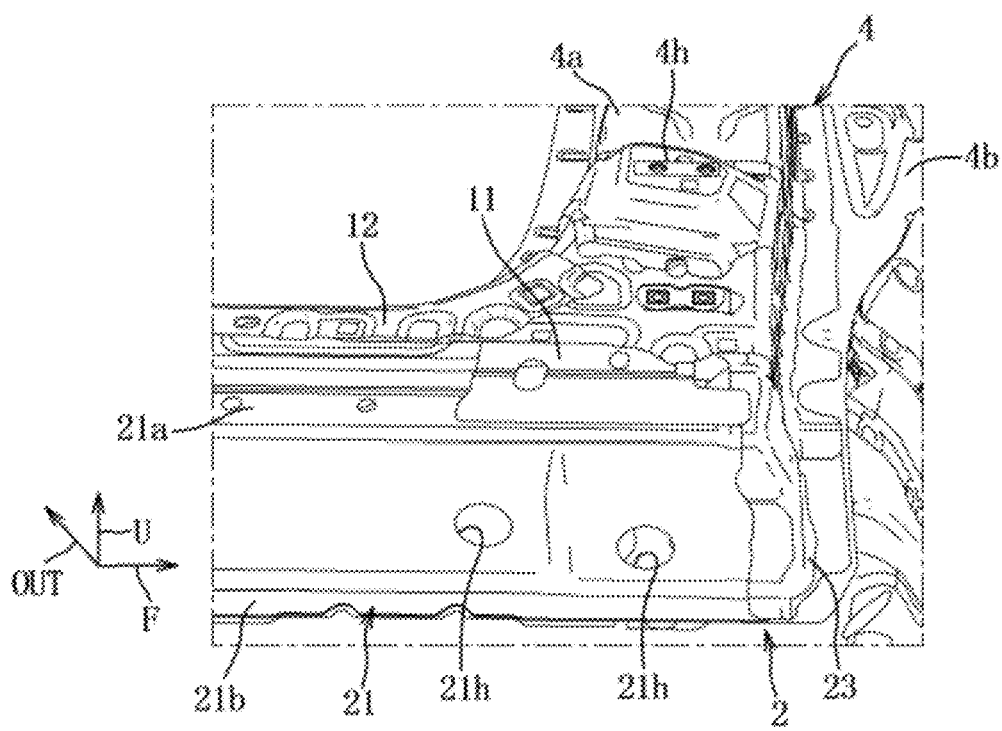
FIG. 3 is a perspective view in which a body portion illustrated in FIG. 1 is seen from below and an outer side in a vehicle width direction.

As illustrated in FIG. 3, a front and rear pair of openings 21h can be formed in a bottom wall portion of body section 21a of the outer panel 21, for instance, in order to remove an electrodeposition liquid that may have accumulated in the first closed cross section C1 in a painting process.

An outer reinforcing member 11, which may be in a flat plate shape, can be joined to an outer portion in the vehicle width direction of a vertical wall portion 21s of the body section 21a, for instance, by spot welding. As illustrated in FIG. 1 to FIG. 4, the outer reinforcing member 11 can have substantially the same longitudinal dimension as the hinge pillar 4.

As illustrated in FIG. 5 to FIG. 7, a lower half portion of the outer reinforcing member 11 can be joined to the outer panel 21 from the outer side in the vehicle width direction, and an upper half portion thereof can be joined to the outer member 4a from an inner side in the vehicle width direction.

The outer reinforcing member 11 can be set to have greater tensile strength than the outer member 4a and have less tensile strength than the inner member 4b. In this way, coupling strength between the outer panel 21 and the outer member 4a can be increased by the outer reinforcing member 11. Thus, the load that may act on the outer panel 21 can be efficiently transmitted to the outer member 4a.

As illustrated in FIG. 1 to FIG. 4, a corner reinforcing member 12 can be provided in a portion near a boundary between an upper wall portion and the vertical wall portion 21s of the outer panel 21 (of the side sill 2). The corner reinforcing member 12 can be formed to have a gently curved shape and a substantially L-shaped cross section in a side view. The corner reinforcing member 12 can be arranged to extend rearward along the upper wall portion of the outer panel 21 from a lower portion of the hinge pillar 4 through a joint portion between the side sill 2 and the hinge pillar 4. The corner reinforcing member 12 can be provided to suppress further retreatment of the front wheel at the time when the front wheel may be retreated and may abut the hinge pillar 4 during the small overlap collision, in other words, to inhibit retreated deformation of the hinge pillar 4.

Next, a description will be made on a reinforcing member 30 that can form a component of an impact energy absorption mechanism according to embodiments of the disclosed subject matter.

Figure 4:
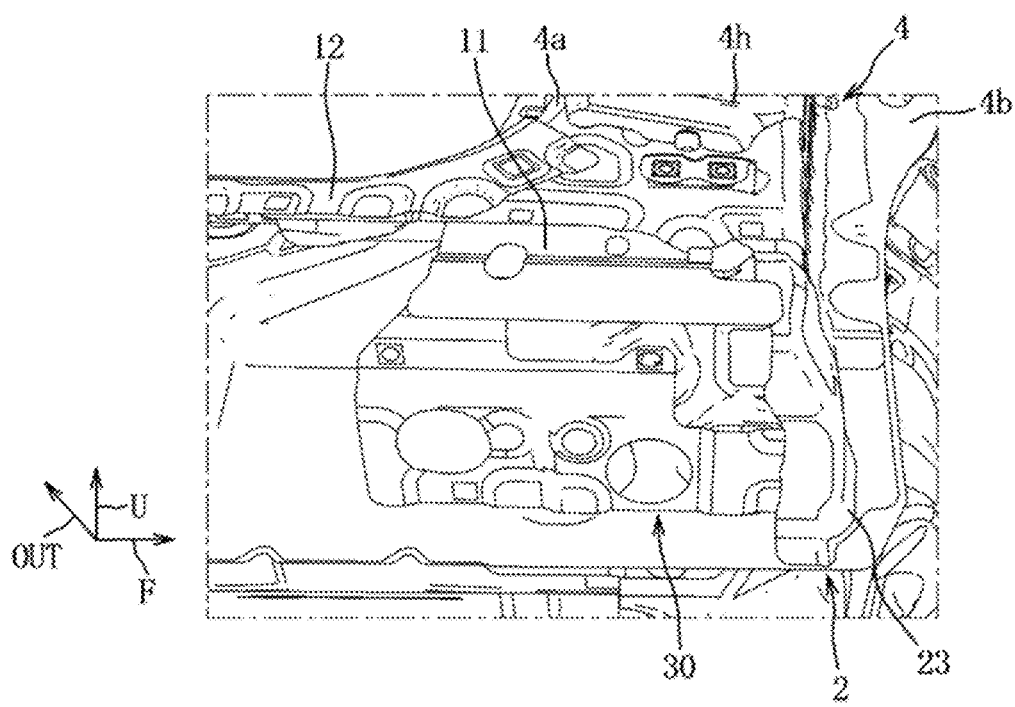
FIG. 4 is a view of an outer panel in the body portion illustrated in FIG. 3 in a see-through manner.

As illustrated in FIG. 4, the reinforcing member 30 can be disposed in the front end portion of the side sill 2.

The reinforcing member 30 can be arranged on the outer side in the vehicle width direction from the inner member 4b in the first closed cross section C1, and can be joined onto the bottom wall portion of the body section 21a of the outer panel 21, for instance, by spot welding in a state of being superposed thereon. The reinforcing member 30 can be integrally shaped by pressing a single metal plate material.

Figure 8:
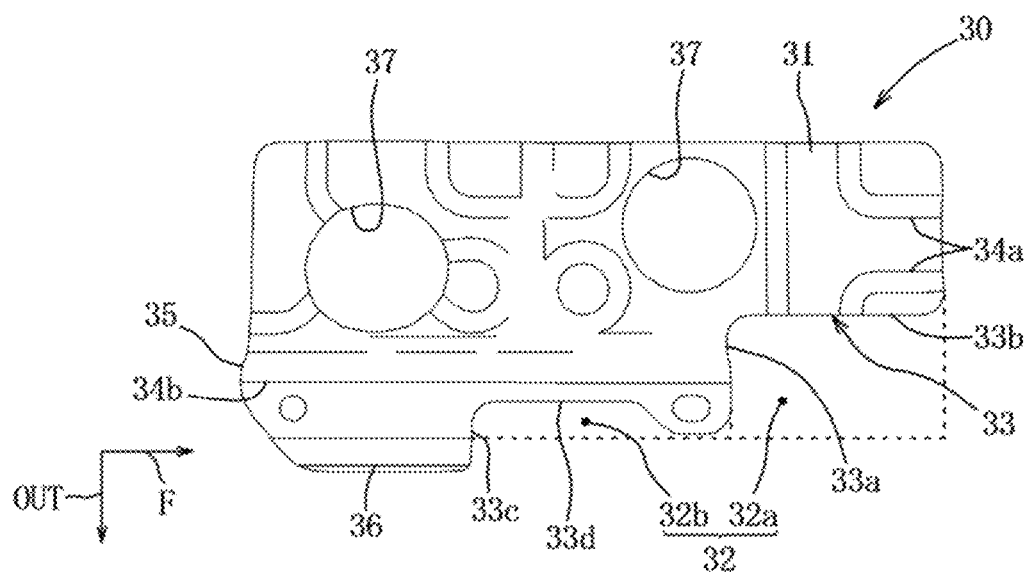
FIG. 8 is a plan view of a reinforcing member according to one or more embodiments of the present disclosure.
Figure 9:
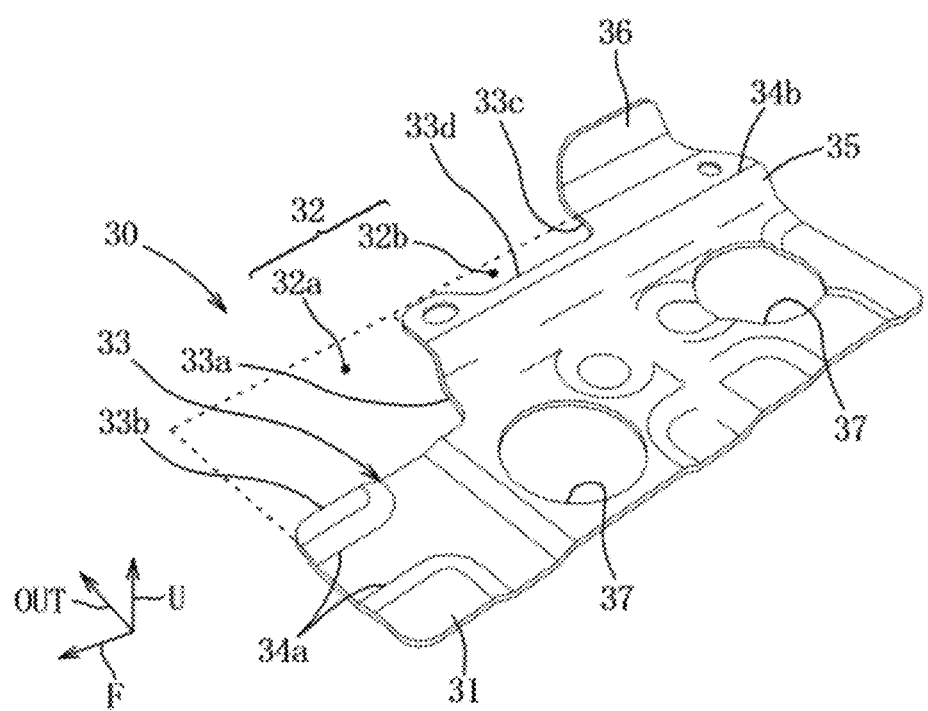
FIG. 9 is a perspective view in which the reinforcing member of FIG. 8 is seen obliquely from the above.
Figure 10:
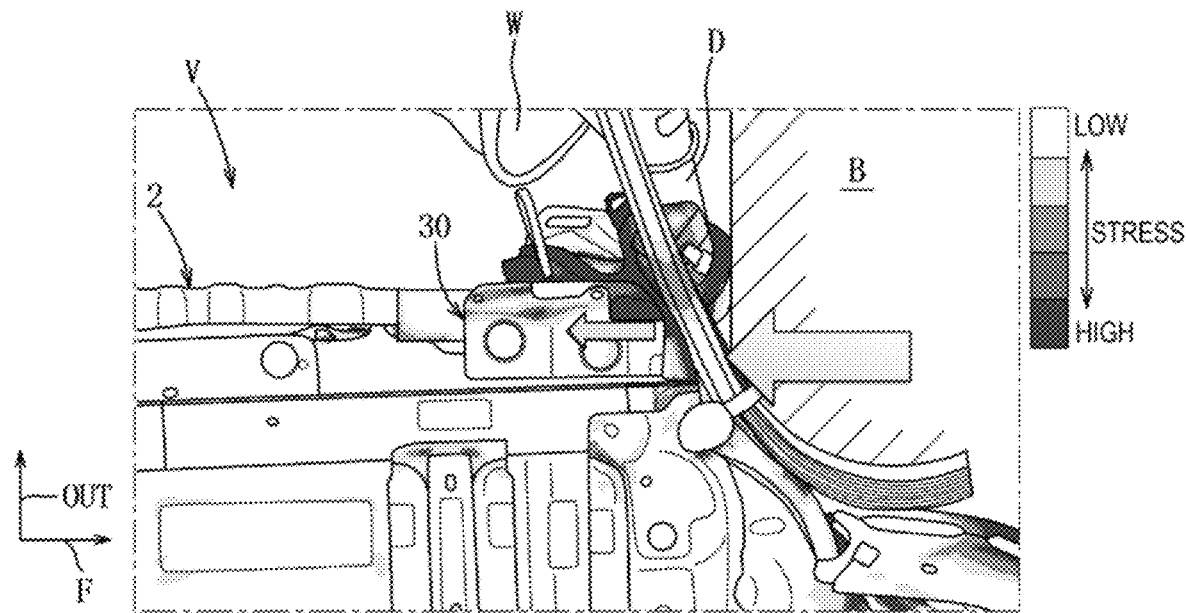
FIG. 10 is a view of an initial state during a small overlap collision according to one or more embodiments of the present disclosure.
Figure 11:
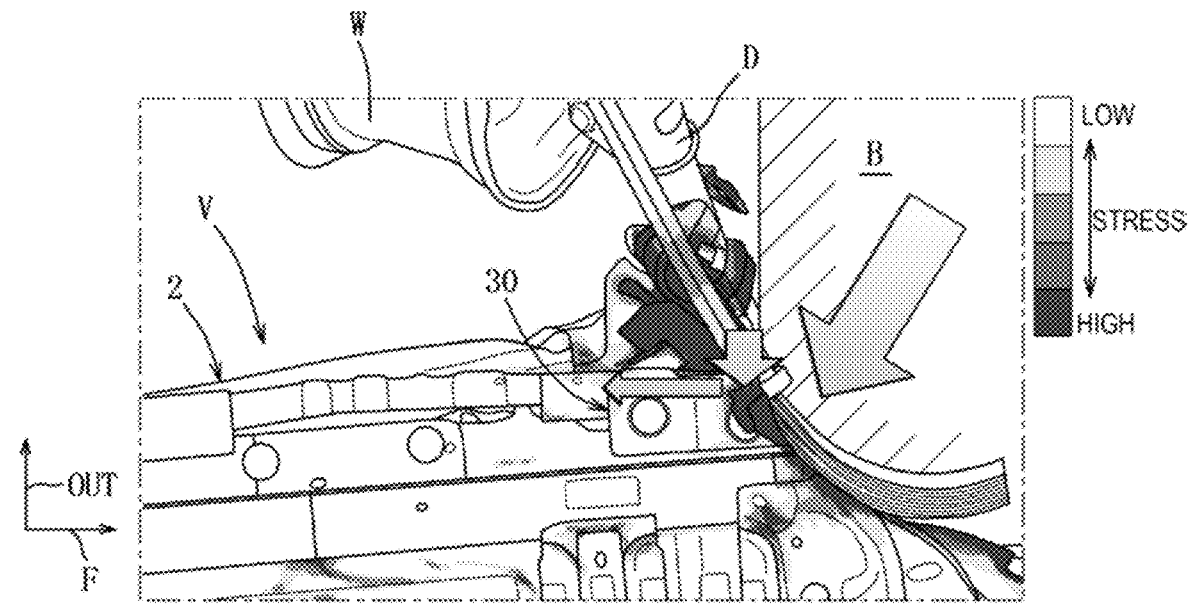
FIG. 11 is a view of an intermediate-term state during the small overlap collision according to one or more embodiments of the present disclosure.

As illustrated in FIG. 8 and FIG. 9, the reinforcing member 30 can have: a front-end reinforcing section 31 that can support the collision load from the front, the collision load being applied to the front end portion of the side sill 2 and directed rearward; a deformation permission section 32 that can permit deformation of the side sill 2 directed inward in the vehicle width direction and rearward at the time when the collision load, which can be directed inward in the vehicle width direction and rearward, can be applied to the front end portion of the side sill 2; a deformation suppression section 33 that can suppress the further deformation of the side sill 2 directed inward in the vehicle width direction and rearward after the deformation of the side sill 2 directed inward in the vehicle width direction and rearward; and the like. This reinforcing member 30 can be set to have greater tensile strength than the inner panel 22 and to have less tensile strength than the outer panel 21 and the inner member 4b.

The front-end reinforcing section 31 can be arranged in a front end portion of the reinforcing member 30 and can be formed to have a substantially rectangular shape in a plan view. As illustrated in FIG. 5, the front-end reinforcing section 31 can be disposed to occupy approximately 40% of the bottom wall portion of the body section 21a in an outward direction from an inner end portion in the vehicle direction thereof.

As illustrated in FIG. 8 and FIG. 9, the front-end reinforcing section 31 can be provided with a right and left pair of first ridgelines 34a that may extend in the front-rear direction. The paired first ridgelines 34a can be formed from a front end portion of the front-end reinforcing section 31 to an intermediate portion of the front-end reinforcing section 31 in the front-rear direction.

The deformation permission section 32 can be formed in a portion on the front side and the outer side in the vehicle width direction of the reinforcing member 30.

More specifically, the deformation permission section 32 can include: a first notched section 32a that can be formed in a portion on the outer side in the vehicle width direction of the front-end reinforcing section 31; and a second notched section 32b that can be formed in the portion on the outer side in the vehicle width direction of the front-end reinforcing section 31 and behind the first notched section 32a.

The first and second notched sections 32a, 32b, which can correspond to the deformation permission section 32, can be each formed to have a substantially rectangular shape in the plan view, and can be set such that a dimension in the vehicle width direction of the first notched section 32a is larger than a dimension in the vehicle width direction of the second notched section 32b. In this way, during the small overlap collision, the first load absorption function, which can partially absorb the inward component in the vehicle width direction of the collision load directed inward in the vehicle width direction and rearward by partial deformation of the side sill 2, can be exerted.

The deformation suppression section 33 can be formed in a portion corresponding to a boundary between the reinforcing member 30 and the first and second notched sections 32a, 32b. As illustrated in FIG. 8 and FIG. 9, for instance, the boundary portion between the reinforcing member 30 and the first and second notched sections 32a, 32b can be provided with: a first portion 33a and a third portion 33c, each of which can be substantially orthogonal to the body front-rear direction and has a linear shape; and a second portion 33b and a fourth portion 33d, each of which can be substantially orthogonal to the vehicle width direction and can have a linear shape. The first notched section 32a and the second portion 33b can be formed on a front side of the first portion 33a. The second notched section 32b and the fourth portion 33d can be formed on a front side of the third portion 33c.

In this way, during the small overlap collision, after the partial deformation of the side sill 2 by the exertion of the first load absorption function, the second load absorption function, which can support the rest of the inward component in the vehicle width direction of the collision load, can be exerted. The first portion 33a and the third portion 33c, which can correspond to the deformation suppression section 33, can support the inward component in the vehicle width direction of the collision load as a shear load. The second portion 33b and the fourth portion 33d, which can correspond to the deformation suppression section 33, can support the inward component in the vehicle width direction of the collision load as a direct pressing load.

As illustrated in FIG. 8 and FIG. 9, for instance, the reinforcing member 30 can include: a step section 35 that can have a second ridgeline 34b, which can extend in the body front-rear direction, at the rear of the first portion 33a and on the outer side in the vehicle width direction; a fixed section 36 that can extend upward from a portion behind the third portion 33c and on an outer side in the vehicle width direction of the step section 35; and the like.

As illustrated in FIG. 6, for instance, the step section 35 can be formed to bend upward from an outer end portion in the vehicle width direction of the first portion 33a and to extend outward in the vehicle width direction from the second ridgeline 34b.

As illustrated in FIG. 7, for instance, the fixed section 36 can be formed to bend upward from an outer end portion in the vehicle width direction of the third portion 33c, and three layers of the outer reinforcing member 11, the vertical wall portion 21s of the body section 21a, and the fixed section 36 can be joined, for instance, by spot welding by interposing the vertical wall portion 21s between the outer reinforcing member 11 and the fixed section 36. The reinforcing member 30 can be formed with a pair of openings 37 aligned in the front-rear direction in a manner to correspond to the openings 21h, which can be provided in the bottom wall portion of the body section 21a and aligned in the front-rear direction.

Next, a description will be made on operational effects of the lower body structure of the vehicle V according to the foregoing description of one or more embodiments of the present disclosure.

Accordingly since the reinforcing member 30 can have the front-end reinforcing section 31 to support the collision load that may be applied to the front end portion of the side sill 2 and may be directed rearward in the vehicle body, it can be possible to support the rearward component in the front-rear direction of the collision load that is directed inward in the vehicle width direction and rearward. Therefore, it can be possible to suppress the collapse of the hinge pillar 4 to the rear side of the vehicle body. As indicated by arrows in FIG. 10, for instance, in an initial stage of the small overlap collision, the front-end reinforcing section 31 of the reinforcing member 30 can receive retreatment of vehicle members such as a wheel W and a driveshaft D. Here, a barrier B is illustrated.

Since the reinforcing member 30 can have the deformation permission section 32 to permit the deformation of the side sill 2 directed inward in the vehicle width direction and rearward at the time when the collision load, which can be directed inward in the vehicle width direction and rearward, can be applied to the front end portion of the side sill 2, it can be possible to partially absorb the inward component in the vehicle width direction of the collision load, which can be directed inward in the vehicle width direction and rearward, by the partial deformation of the side sill 2. Since the reinforcing member 30 can have the deformation suppression section 33 to suppress the further deformation of the side sill 2 after the deformation of the side sill 2 directed inward in the vehicle width direction and rearward, it can be possible to support the rest of the inward component in the vehicle width direction of the collision load, which can be directed inward in the vehicle width direction and rearward. Therefore, it can be possible to avoid misshaping of the cross section, which can be caused by the inward collapse deformation of the side sill 2, and to transmit and disperse the collision load rearward in the vehicle body. As indicated by arrows in FIG. 11, for instance, in an intermediate term of the small overlap collision, the deformation of the side sill 2 directed inward in the vehicle width direction can be permitted. In this way, the collision load applied to the deformation suppression section 33 can be reduced, the inward collapse deformation of the side sill 2 can be suppressed, and ruptures of the flanges 21b, 22b, which may be associated with misshaping of the cross section, can be minimized or avoided.

Since the deformation permission section 32 can be formed by the first and second notched sections 32a, 32b that may be formed by notching the portion on the outer side in the vehicle width direction of the reinforcing member 30, the deformation permission section 32 can be formed by a simple structure. Thus, manufacturing cost of the reinforcing member 30 can be inexpensive.

Since the deformation suppression section 33 can include: the first portion 33a and the third portion 33c, each of which can be substantially orthogonal to the body front-rear direction; and the second portion 33b and the fourth portion 33d, each of which can be substantially orthogonal to the vehicle width direction, the deformation suppression section 33 can be formed by a simple structure.

Since the dimension in the vehicle width direction of the first notched section 32a, which can be formed on the front side of the first portion 33a of the deformation suppression section 33, can be greater than the dimension in the vehicle width direction of the second notched section 32b, which can be formed at the rear of the first portion 33a of the deformation suppression section 33, the side sill 2 can smoothly be deformed inward in the vehicle width direction and rearward.

The hinge pillar 4, which can have the outer member 4a and the inner member 4b that can cooperate with the outer member 4a to form the second closed cross section C2 extending in the up-down direction, can be provided. The inner member 4b can be interposed between the outer panel 21 and the inner panel 22 of the side sill 2 in the manner to divide the first closed cross section C1 into an inner portion and an outer portion in the vehicle width direction. The reinforcing member 30 can be disposed on the outer side in the vehicle width direction from the inner member 4b in the first closed cross section C1. Thus, the reinforcing member 30 can be downsized.

Since the reinforcing member 30 can have the step section 35 that can include the second ridgeline 34b, which can extend in the front-rear direction, at the rear of the first portion 33a of the deformation suppression section 33 and on the outer side in the vehicle width direction, it can be possible to transmit and disperse the collision load, which may be applied to the front-end reinforcing section 31, rearward by using the second ridgeline 34b.

The fixed section 36, which can extend in the up-down direction from the outer side in the vehicle width direction of the step section 35, can be provided. The fixed section 36 can be joined to the vertical wall portion 21s of the body section 21a (the outer panel 21). Thus, it can be possible to further suppress the inward collapse deformation of the side sill 2.

The hinge pillar 4 that can have the outer member 4a and the inner member 4b that can cooperate with the outer member 4a to form the closed cross section extending in the up-down direction can be provided. The outer reinforcing member 11 that can reinforce the outer member 4a and can be joined to the outer panel 21 of the side sill 2 can be provided. The three layers of the fixed section 36, the outer panel 21, and the outer reinforcing member 11, can be joined by interposing the outer panel 21 between the fixed section 36 and the outer reinforcing member 11. Thus, it can be possible to transmit and disperse the collision load, which can be applied to the front-end reinforcing section 31, to the outer member 4a by using the outer reinforcing member 11.

Second Embodiment

Next, a description will be made on a reinforcing member 30A according to a second embodiment with reference to FIG. 12 and FIG. 13. Members similar to those in the first embodiment will be denoted by the same reference signs.

In the first embodiment, the deformation suppression section 33 can include: the first and third portions 33a, 33c, each of which can be orthogonal to the body front-rear direction; and the second and fourth portions 33b, 33d, each of which can be orthogonal to the vehicle width direction. Meanwhile, in the second embodiment, a deformation suppression section 33A can include a fifth portion 33e that can be substantially orthogonal to the direction that can be inward in the vehicle width direction and rearward.

Figure 12:
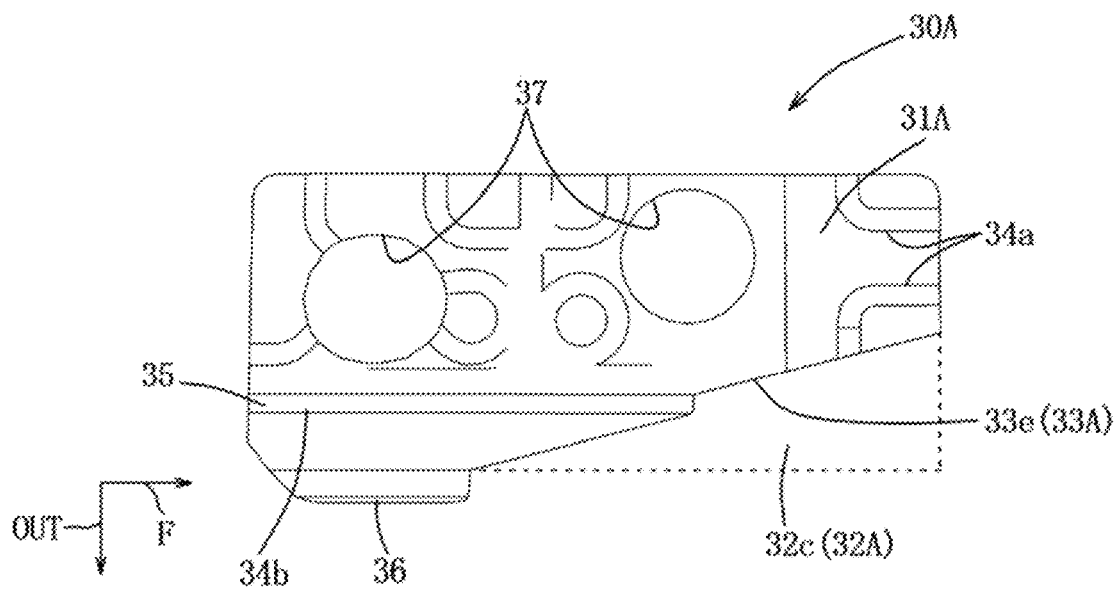
FIG. 12 is a plan view of a reinforcing member according to a modified embodiment of the present disclosure.
Figure 13:
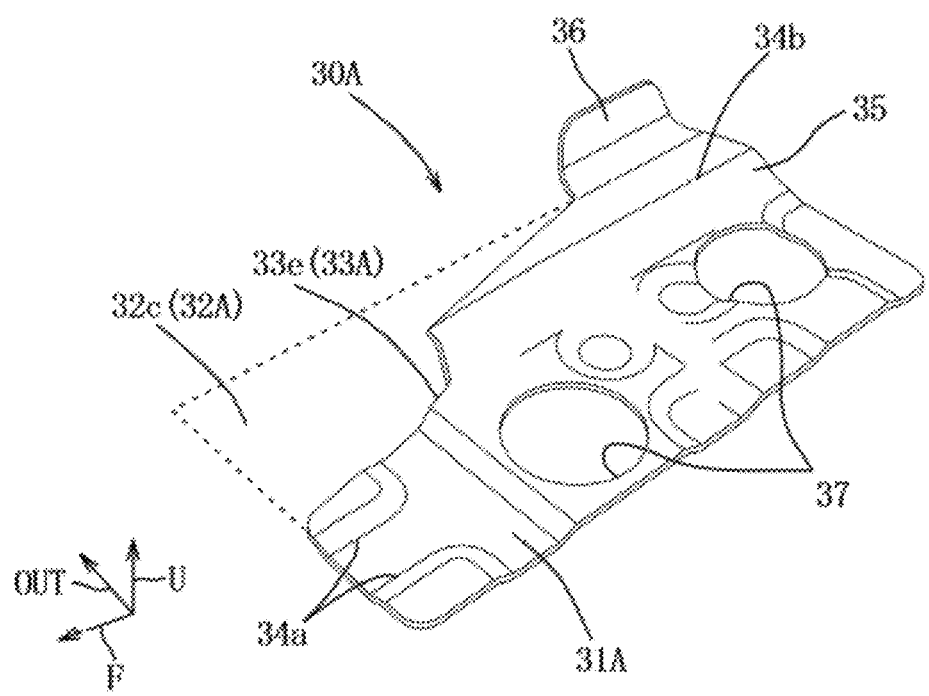
FIG. 13 is a perspective view in which the reinforcing member according to the modified embodiment of FIG. 12 is seen obliquely from the above.

As illustrated in FIG. 12 and FIG. 13, for instance, the reinforcing member 30A can have as components: a front-end reinforcing section 31A; a deformation permission section 32A that can permit the deformation of the side sill 2 directed inward in the vehicle width direction and rearward at the time when the collision load, which can be directed inward in the vehicle width direction and rearward, can be applied to the front end portion of the side sill 2; a deformation suppression section 33A that can suppress the further deformation of the side sill 2 after the deformation of the side sill 2 directed inward in the vehicle width direction and rearward; and the like.

The front-end reinforcing section 31A can be arranged in a front end portion of the reinforcing member 30A and can be formed to have a substantially rectangular shape in the plan view. The deformation permission section 32A can be formed in a portion on the front side and the outer side in the vehicle width direction of the reinforcing member 30A, and can include a third notched section 32c that can have a substantially triangular shape in the plan view. The third notched section 32c can be formed such that a dimension thereof in the vehicle width direction can be increased forward in the body front-rear direction.

The deformation suppression section 33A can be formed in a portion corresponding to a boundary between the third notched section 32c and the reinforcing member 30A. In the portion corresponding to the boundary between the third notched section 32c and the reinforcing member 30A, a fifth portion 33e can be provided to move inward to the front in the body front-rear direction. In this way, the reinforcing member 30A can have a simple structure, and the side sill 2 can smoothly be deformed inward in the vehicle width direction and rearward.

Next, a description will be made on modified embodiments in each of which the embodiment is partially modified.

1] In the embodiment, the description has been made on the example in which the reinforcing member 30 can be superposed on the bottom wall portion of the body section 21a in the first closed cross section C1. However, the reinforcing member 30 may be disposed in a manner to be superposed on an upper wall portion of the body section 21a in the first closed cross section C1. Alternatively, in the case where the first closed cross section C1 is not divided into the inner portion and the outer portion by the inner member 4b, the reinforcing member 30 can also be disposed in a manner to be superposed on the bottom wall portions or the upper wall portions of the body section 21a and the body section 22a.

2] In the embodiment, the description has been made on the example in which the deformation permission section 32 can include the first and second notched sections 32a, 32b.

However, the deformation permission section 32 may only need to partially absorb the inward component in the vehicle width direction of the collision load, which can be directed inward in the vehicle width direction and rearward, by the partial deformation of the side sill 2. Thus, the deformation permission section can include a fragile section. For example, the deformation permission section may be formed from another material having low rigidity, or may be formed to have the low rigidity by etching or slit processing.

3] In the embodiment, the description has been made on the example in which the side sill 2 can include the outer panel 21 and the inner panel 22 that can cooperate with the outer panel 21 to form the first closed cross section C1. However, the side sill may be formed from a single member by extruding an aluminum alloy material.

4] In addition to the above, those skilled in the art can implement a mode, in which various modifications are added to the embodiment, or a mode, in which the embodiments are combined, without departing from the gist of the present disclosure, and the present disclosure includes such modified modes.

The invention claimed is:

1. A vehicle lower body structure comprising:
a side sill that extends in a body front-rear direction and forms a first closed cross section; and
a reinforcing member that is provided in the first closed cross section to reinforce a front end portion of the side sill, wherein
the reinforcing member has:
a front-end reinforcing section that supports a collision load applied to the front end portion of the side sill and directed rearward in a vehicle body;
a deformation permission section that permits deformation of the side sill directed inward in a vehicle width direction and rearward at a time when the collision load directed inward in the vehicle width direction and rearward is applied to the front end portion of the side sill; and
a deformation suppression section that suppresses deformation of the side sill after the deformation of the side sill directed inward in the vehicle width direction and rearward.

2. The vehicle lower body structure according to claim 1, wherein
the deformation permission section includes a notched section in an outer portion in the vehicle width direction of the reinforcing member.

3. The vehicle lower body structure according to claim 2, wherein
the deformation suppression section includes: a first portion that is substantially orthogonal to the body front-rear direction; and a second portion that is substantially orthogonal to the vehicle width direction.

4. The vehicle lower body structure according to claim 3, wherein
the notched section includes a first notched section and a second notched section, and
a dimension in the vehicle width direction of the first notched section, which is formed on a front side of the first portion of the deformation suppression section, is greater than a dimension in the vehicle width direction of the second notched section, which is formed at the rear of the first portion of the deformation suppression section.

5. The vehicle lower body structure according to claim 2, wherein
a dimension in the vehicle width direction of the notched section increases forward in the body front-rear direction.

6. The vehicle lower body structure according to claim 5 further comprising:
a hinge pillar having an outer member and an inner member that cooperates with the outer member to form a second closed cross section extending in an up-down direction, wherein
the inner member is interposed between an outer panel and an inner panel of the side sill so as to divide the first closed cross section into an inner portion and an outer portion in the vehicle width direction, and
the reinforcing member is disposed on an outer side in the vehicle width direction from the inner member in the first closed cross section.

7. The vehicle lower body structure according to claim 6, wherein
the reinforcing member has a step section with a ridgeline, which extends in the body front-rear direction, at the rear of the first portion of the deformation suppression section and on the outer side in the vehicle width direction.

8. The vehicle lower body structure according to claim 7 further comprising:
a fixed section that extends in the up-down direction from the outer side in the vehicle width direction of the step section, wherein
the fixed section is joined to a vertical wall portion of the outer panel.

9. The vehicle lower body structure according to claim 8 further comprising:
a hinge pillar having an outer member and an inner member that cooperates with the outer member to form a second closed cross section extending in an up-down direction; and
an outer reinforcing member that reinforces the outer member and is joined to the outer panel of the side sill, wherein
three layers of the fixed section, the outer panel, and the outer reinforcing member are joined by interposing the outer panel between the fixed section and the outer reinforcing member.

10. The vehicle lower body structure according to claim 9, wherein
a dimension in the vehicle width direction of the notched section increases forward in the body front-rear direction.

11. The vehicle lower body structure according to claim 10, wherein
the inner member of the hinge pillar is interposed between an outer panel and an inner panel of the side sill so as to divide the first closed cross section into an inner portion and an outer portion in the vehicle width direction, and
the reinforcing member is disposed on an outer side in the vehicle width direction from the inner member in the first closed cross section.

12. The vehicle lower body structure according to claim 11, wherein
the reinforcing member has a step section with a ridgeline, which extends in the body front-rear direction, at the rear of the first portion of the deformation suppression section and on the outer side in the vehicle width direction.

13. The vehicle lower body structure according to claim 12 further comprising:

a fixed section that extends in the up-down direction from the outer side in the vehicle width direction of the step section, wherein
the fixed section is joined to a vertical wall portion of the outer panel.

14. The vehicle lower body structure according to claim 1, wherein
the deformation permission section includes a notched section in an outer portion in the vehicle width direction of the reinforcing member, and
a dimension in the vehicle width direction of the notched section increases forward in the body front-rear direction.

15. The vehicle lower body structure according to claim 1 further comprising:
a hinge pillar having an outer member and an inner member that cooperates with the outer member to form a second closed cross section extending in an up-down direction, wherein
the inner member is interposed between an outer panel and an inner panel of the side sill so as to divide the first closed cross section into an inner portion and an outer portion in the vehicle width direction, and
the reinforcing member is disposed on an outer side in the vehicle width direction from the inner member in the first closed cross section.

16. The vehicle lower body structure according to claim 2, wherein
a dimension in the vehicle width direction of the notched section increases forward in the body front-rear direction.

17. The vehicle lower body structure according to claim 2 further comprising:
a hinge pillar having an outer member and an inner member that cooperates with the outer member to form a second closed cross section extending in an up-down direction, wherein
the inner member is interposed between an outer panel and an inner panel of the side sill so as to divide the first closed cross section into an inner portion and an outer portion in the vehicle width direction, and
the reinforcing member is disposed on an outer side in the vehicle width direction from the inner member in the first closed cross section.

18. The vehicle lower body structure according to claim 14, further comprising:
a hinge pillar having an outer member and an inner member that cooperates with the outer member to form a second closed cross section extending in an up-down direction, wherein
the inner member of the hinge pillar is interposed between an outer panel and an inner panel of the side sill so as to divide the first closed cross section into an inner portion and an outer portion in the vehicle width direction, and
the reinforcing member is disposed on an outer side in the vehicle width direction from the inner member in the first closed cross section.

19. The vehicle lower body structure according to claim 15, wherein
the reinforcing member has a step section with a ridgeline, which extends in the body front-rear direction, at the rear of the first portion of the deformation suppression section and on the outer side in the vehicle width direction.

* * * * *